(12) United States Patent
Karch

(10) Patent No.: US 7,140,035 B1
(45) Date of Patent: Nov. 21, 2006

(54) RULE BASED SECURITY POLICY ENFORCEMENT

(75) Inventor: Robert Karch, Westfield, NJ (US)

(73) Assignee: Teleran Technologies, Inc., Fairfield, NJ (US)

( * ) Notice: Subject to any disclaimer, the term of this patent is extended or adjusted under 35 U.S.C. 154(b) by 0 days.

(21) Appl. No.: 09/495,509

(22) Filed: Feb. 1, 2000

(51) Int. Cl.
   G06F 17/00 (2006.01)
   G06N 5/02 (2006.01)

(52) U.S. Cl. .............. 726/1; 706/47; 705/500

(58) Field of Classification Search .......... 713/200; 706/45–47; 700/1, 28, 49; 705/500; 726/1; 703/2, 13, 21, 22
   See application file for complete search history.

(56) References Cited

U.S. PATENT DOCUMENTS

| | | | | |
|---|---|---|---|---|
| 5,377,354 A | * | 12/1994 | Scannell et al. | 709/103 |
| 6,055,637 A | * | 4/2000 | Hudson et al. | 713/201 |
| 6,073,142 A | * | 6/2000 | Geiger et al. | 715/500 |
| 6,098,172 A | * | 8/2000 | Coss et al. | 726/11 |
| 6,460,141 B1 | * | 10/2002 | Olden | 726/4 |

OTHER PUBLICATIONS

Sandhu, R., "Transaction Control Expressions for Separation of Duties," Fourth Aerospace Computer Security Applications Conference (IEEE), pp. 282-286, Dec. 12-16, 1988.*
Sandhu, R. S., "Lattice-Based Access Control Models," IEEE Computer, vol. 25, Issue 11, pp. 9-19, Nov. 1993.*

* cited by examiner

Primary Examiner—Emmanuel L. Moise
Assistant Examiner—Zachary A. Davis
(74) Attorney, Agent, or Firm—Kaplan Gilman Gibson & Dernier LLP

(57) ABSTRACT

A rules based system enforces security policies in a data access management system. The rules based system provides rules that preclude certain activities, but those rules are only implemented and fired upon certain conditions occurring. This results in certain actions being precluded when specified conditions are true, without additional software required to check for the condition each time the action is requested.

46 Claims, 1 Drawing Sheet

Creation and Implementation of
Rules for the Enforcement of Security Policies

RULE BASED SECURITY POLICY ENFORCEMENT

TECHNICAL FIELD

This invention relates to the enforcement of security policies with respect to data base access, and more specifically, to an improved rule based access control mechanism that is preferably used to enforce security policies such as dynamic and static separation of duties, confidentiality, compliance and privacy.

BACKGROUND OF THE INVENTION

In data access systems, often records are being accessed, modified, deleted, and added by various personnel on a daily or even hourly basis. In large organizations there could be hundreds of people accessing various records and changing them from time to time. It is important however, that security policies be enforced. For example, due to the potential for fraud and embezzlement, it is important that two or more people be involved in the total implementation of certain processes. Such a separation of duties policy reduces the potential for fraud because it requires that multiple people would have to conspire with each other in order to implement a dishonest transaction. Consider a record in a database created which reflects the ordering of a particular item. The company will incur a cost for such item, and approval is required. A record would be created in the database reflecting the order.

When payment is made, it is preferable that a different entity be responsible for signing the check and making payment. This precludes the ordering entity from ordering items that should not be ordered. Thus, in order to draft and sign the check for payment for the order, an additional entity should be involved. This additional entity means that for someone to order and pay for goods for a particular purchase, at least two parties would have to be involved in any potential fraud. This greatly decreases the possibility of such fraud occurring.

An example of another kind of security policy is conflict of interest, specifically a 'Chinese Wall Policy'. This policy prevents an analyst who is consulting for company A from accessing potentially sensitive information on company B, a competitor of company A, thus preventing the analyst from providing company A with confidential information about company B (or making recommendations to company A based on this confidential information). Separation of duties is considered to be an integrity policy while conflict of interest would be a confidentiality policy. Other security policies such as compliance to legislative regulations, and privacy are also enforced through security policies.

One prior art solution to enforcement of the separation of duties policy is to include a rule within the data access software that tests for the occurrence of a first action by a particular entity each time a specified second action is attempted. Specifically, the software simply includes a rule that if entity A is the particular entity which wrote the order, then entity A cannot process the transaction required to pay the invoice. Thus, each time an invoice payment is requested, the software would check to determine if the entity processing the invoice is the same entity that placed the order. If so, the transaction would be disallowed. Such a technique enforces a separation of duties and thereby minimizes the possibility of the occurrence of fraud.

The implementation of such an arrangement is less than perfect and is not without significant cost. First, the variety of rules regarding who can do what during specific times or with specific other conditions often leads to complex code which is difficult to modify and debug. For example, each time any action is requested, the software has to check every possible combination of prohibited transactions to determine if permitting the desired transaction would violate any rule.

Additionally, the execution time is greatly slowed by the fact that a large number of lines of code must be executed each and every time through any data access. This is extremely wasteful since, for the most part, most of the rules are not even needed unless certain other conditions apply.

An additional problem is that the separation of duties policy of prior systems is primitive in its user interface. There is little notification to users of the particular problems being encountered, and there is little flexibility in terms of changing the rules for different conditions.

Another prior art solution attaches attributes or labels to the transaction items that represent the objects on which operations require compliance with the separation of duties policy. These attributes maintain the history of operations on the object and rules are written that utilized the information contained in these attributes. The major drawback of this approach is that unless these attributes were designed into the system from the beginning, it can be prohibitively expensive to modify large legacy systems to contain and maintain the necessary attributes.

Both solutions suffer from the drawback that they only solve the separation of duties problem. Other solutions must be implemented to enforce other security policies.

SUMMARY OF THE INVENTION

The foregoing and other problems of the prior art are and a technical advance is achieved in accordance with the present invention, which relates to a method and apparatus for enforcing security policies in a user flexible manner. Moreover, the system of the present invention does not require a large amount of excess code, nor does it make any requirements for special attributes to be attached to the protected transaction items (i.e. objects.) It can also be applied to enforcement of multiple types of security policies.

In accordance with the teaching of the present invention, an object oriented rules based system is utilized which provides for an administrator to add Transient Rule Generator (TRG) rules which upon certain conditions occurring, will automatically generate transient custom rules. These transient custom rules will prevent the occurrence of some event only during a pre-defined relevant time period. Thus, if a particular condition X occurs, the data access software is automatically altered to preclude condition Y. At the expiration of condition X, the rule precluding action Y is then removed from the data access code. The administrator may also enter customized rules directly.

In additional embodiments, the user or some other designated recipient is given messages regarding the particular reason for the denial, and may also be notified when the denial of a particular action takes effect, or terminates. Further, the security policies may be based upon the role of the user, as opposed to his or her particular identity.

DETAILED DESCRIPTION OF THE PREFERRED EMBODIMENT

Figure 1:
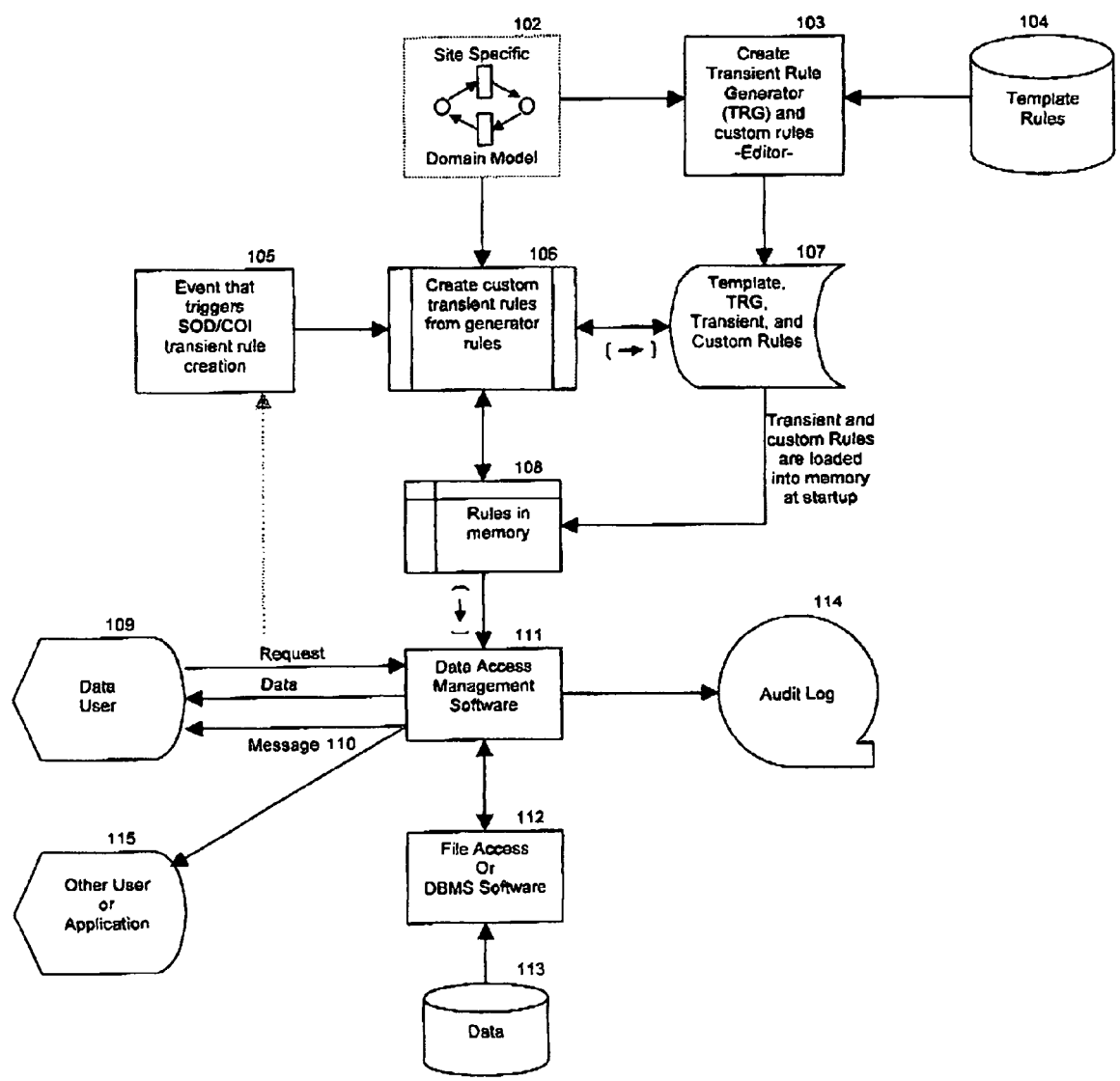
FIG. 1 is a functional block diagram of the components of the present invention.

The arrangement of FIG. 1 is intended to implement the teachings of the present invention which can be used to enforce security policies without the problems described above with respect to the prior art. As illustrated in the arrangement of FIG. 1, a site specific domain model 102 is used by an editor 103 to selectively create Transient Rule Generator (TRG) Rules and customized template rules that are appropriate for a given environment, based on a set of Template Rules 104. The site specific domain model provides information that is specific to any particular data access environment. This includes actual table and file names, schema names, user names, role names etc. The editor 103 places these rules into a permanent storage area 107 (104 and 107 may be the same storage location, but this is not required). These rules are designed to generate new rules that prohibit certain data transactions from taking place. The TRG rules are accessed and read for further customization, then integrated into the data access management software 111 at particular times as described hereafter. Custom rules are loaded directly into memory 108. A request from a user 109 to access data 113 that meets the appropriate condition, produces an event 105 that will cause a TRG rule to create a transient customized rule 106 from a Template Rule previously loaded from the permanent storage 104, if the conditions specified in the TRG Rule are met. Rules are accessed in memory 108 and applied by data access management software 111 to the user request. A file access or database manager 112 and a communication function 110 are also represented in FIG. 1. The user communications may take place via an intranet, the Internet, or any other available communications channel.

In operation, hundreds of users may be accessing data 113 with the file access or database manager 112 via the data access management software 111. The arrangement of FIG. 1 provides for the data access management software 111 to fire rules depending upon certain conditions. The rules are all stored together in a rules file 107.

If a particular condition exists or action is taken which should prohibit a second action Y from being implemented, the data access management software 111 will simply have a rule precluding Y. The rules file 107 includes that rule and the rule is loaded into memory 108 and implemented for firing at 111 if and when condition X arises. At the end of condition X (e.g. the invoice has been paid) the rule prohibiting action Y is eliminated from software 111 and marked for archive from permanent storage 107 to an audit log 114.

As an example, we consider the order and invoice situation described above with respect to the prior art. Specifically, when it is desirable to prohibit an individual from paying an invoice, a rule precluding that individual from signing off to pay that invoice is loaded into the data access management software 111 and will fire each time an update to that invoice is attempted. This rule would be generated at 106 immediately upon the purchase order being placed 105. Thus, if an individual placed the purchase order, that purchase order transaction would cause the rule to be generated and integrated into the data access management software 111. The rule would then preclude the payment of an invoice by a particular individual, namely he or she who signed off on the purchase order.

The rule is only loaded when the specified user logs on to the system and is only tested when the user performs some action. Upon the invoice being paid, the rule no longer needs to occupy processing power in software 111, and the rule is immediately eliminated. Unlike prior systems, the rule need not be fired and return a false each time the payment of an invoice is attempted. That is, if the user did not enter the order, no rule exists for this user so no rule need be tested.

In the conflict of interest example of a "Chinese Wall", an analyst consulting for a specific company must be prevented from accessing information about companies that are competitive with that company. A new analyst who is not consulting for any companies will have the ability to access information from any company in the database. The event of that analyst selecting information about any given company 105, will cause a transient rule to be generated 106, then loaded into memory 108 and saved to permanent storage 107. This rule will then be used by the data access management software 111 to prevent the analyst from accessing 112 any information about competitive companies stored in the database or file system 113. This rule will remain in effect until some pre-defined event occurs that indicates the analyst is no longer violating a conflict of interest when accessing information on a competitive company. This may be on the condition that the analyst has not accessed information for his previous company for some time period. This time period is considered to be long enough that information accessed is out of date and no longer considered sensitive or having any significant value. The event may be that all the information accessed by the analyst has been made public. The event may be an override issued by an authorized individual. The event may be the removal of the previous company from the database or the conflict set. At the notification of this event, the rule will remove itself from consideration in the data access management software 111 and mark itself as inactive to be archived for audit purposes from permanent storage 107 to an audit log 114. Upon this occurring, the rule might notify the user 109 or some other designated recipient 115 (via message or e-mail or some other form of notification 110) of her/his change of status. The recipient may be a person or another computer process.

In accordance with the teachings of the invention therefore, conditions are precluded under certain circumstances not by testing for the existence of the circumstance to determine whether or not to allow the action. Rather, upon the circumstance occurring, a rule that unequivocally disallows the action is placed into the data access management software. Moreover, the rule is maintained in the data access management software only for the minimum amount of time required to enforce the security policy. More specifically, the rule is only loaded when the specified user logs on to the system. The rule only fires during the duration of the condition under which a particular action is to be precluded, and only for the specified user.

In an enhanced embodiment, the user is notified of the particular time frame or condition that has caused his or her attempted action to be precluded. Thus, a user may be notified that because he was the individual signing the invoice, he may not pay that invoice. In this manner, the user will know that he can pay other invoices or can pay for that invoice if someone else places the order, or that he cannot access information about a company because it would be a conflict of interest.

An expansion of the invention relates not to individual users but to particular roles. Thus, for example, the security policy may relate to an accounting department individual when compared to an individual in the role of Human Resources personnel. In such a scenario, a rule precluding a particular role from accomplishing any one or more actions may be implemented on the condition that a particular condition has been met. The security policy is thus not based upon the identity of the individual, but upon the role in which that individual works.

Often roles are used to implement static separation of duties. Specifically, a clerk role may be able to enter an order, but cannot approve any orders. This is handled by the current invention through the customization of template rules, which occurs in the editor 103. These rules are static and thus do not require any dynamic behavior.

Audit trails and records keeping are also contemplated by the invention. Specifically, each transient rule that is created is archived along with its lifetime and statistics of its use. For example, each time an attempt is made to accomplish a precluded action, a system may log such an event for later review by security personnel. The system would then have a record of how many times during an interval that action Y was precluded and was attempted.

If action Y is attempted too many times during the interval that it is precluded, additional security could preclude action Y altogether, even after the interval is over, unless and until overwritten with a supervisory function. Notifications may also be sent to the individual's manager, security personnel or some other computer process informing them of the situation. It is anticipated that certain race conditions may occur where the user attempts to violate the security policy before the rule can be generated. Insuring that the rule is generated and active before the first transaction is allowed to complete prevents this. In the event that the transaction fails, the rule would be made inactive. Since it is likely that the user will attempt to re-try the transaction if it fails, the rule need not be removed, but will be re-activated when the user re-submits the transaction. If the transaction has not been successfully completed at the time the user logs off the system, the rule will be removed at that time.

While the above describes the preferred embodiment of the invention, various modifications or additions will be apparent to those of skill in the art. Such additions and modifications are intended to be covered by the following claims.

What is claimed:

1. A method of enforcing security policies in a data access system, said data access system having data access management software in program memory, said method comprising:
    defining a first condition;
    upon occurrence of said first condition, placing a rule into data access management software in said data access system, said rule testing for a second condition and precluding an action if said second condition is present, said rule being stored remotely and only loaded into program memory for the duration of said first condition, said rule being placed into data access management for an amount of time that differs from an amount of time for which a user is logged on.

2. The method of claim 1 wherein said condition is effectuation of a first transaction by a user and said second action is the effectuation of a related transaction by the same user.

3. The method of claim 2, further comprising eliminating said rule from said data access management software immediately upon rescinding of said condition.

4. The method of claim 2 wherein a user attempting to effectuate said second action is informed of said first condition or said second condition and advised automatically that said second action is prohibited.

5. The method of claim 2 wherein said first action is the ordering of goods or services and said second action is the payment for such goods or services and said second condition is the user attempting such payment is the same user ordering said goods or services.

6. The method of claim 1 wherein said first condition is effectuation of a first transaction by a first user in a particular role, and said action is the effectuation of a second transaction and said second condition is that a specified user is associated with said second action.

7. The method of claim 6 wherein the first user and the specified user are different.

8. The method of claim 6 wherein the rule is not loaded until a user in a specified role logs on to the system.

9. The method of claim 6 wherein the rule is only tested for a user in a specified role.

10. The method of claim 1 wherein said rule is generated from a template rule.

11. The method of claim 1 wherein the rule is not loaded until a specified user logs on to the system.

12. The method of claim 1 wherein the rule is only tested for a specified user.

13. The method of claim 1 wherein the security policy is separation of duties.

14. The method of claim 1 wherein the security policy is compliance to regulation.

15. The method of claim 1 wherein the security policy is privacy of data.

16. The method of claim 1 wherein said rule is generated upon occurrence of said condition.

17. Apparatus for enforcing security policies to increase security of data access management software, said apparatus comprising:
    a file of rules, said rules only being applicable to prevent specified data transactions by a first user upon the effectuation of a specified action by said first user, said specified action occurring after said user logs on to said data access management software and being defined by one or more transactions a user may effectuate;
    software for recognizing that said first user has effected said specified action, and
    means for reading said file, locating said rules to prevent said specified data transactions, and, upon occurrence of said specified action of said first user, integrating said rules into said data access management software such that said specified data transactions are prohibited, wherein said rules are not integrated with said data access management software prior to said occurrence of said specified action.

18. Apparatus of claim 17 wherein further comprising means for eliminating the rule from the data access management software at the conclusion of a predetermined time or upon a predetermined condition.

19. The apparatus of claim 18 wherein the eliminated rule is saved in an audit log.

20. The apparatus of claim 17 further comprising means for generating said rules upon occurrence of said specified action of said first user.

21. A method of enforcing confidentiality in the form of a wall comprising the steps of:
    storing at least one rule that prohibits a known party from accessing specified information in a database or file of a data access system if a first specified condition occurs after said known party has logged on to said data access system;
    upon a first specified condition occurring, modifying data access management software to include a rule that prohibits a known party from accessing specified information in a database or file;

said first specified condition being indicative of said known party having knowledge of a particular set of information; and upon a second specified condition occurring, removing said rule from the data access management software and storing said rule for future use, said specified second condition indicating that said knowledge is no longer sensitive.

22. The method of claim 21 wherein said rule is generated from a template rule.

23. The method of claim 22 wherein said known party is defined as any individual engaged in a predetermined role.

24. The method of claim 23 wherein the rule is not loaded until a user in a specified role logs on to the system.

25. The method of claim 23 wherein the rule is only tested for a user in a specified role.

26. The method of claim 22 wherein some other individual, not the known party, is notified of the occurrence of said second condition.

27. The method of claim 26 wherein said notification is via e-mail.

28. The method of claim 22 wherein another individual, not the known party, is notified when the known party attempts the prohibited second action more than once.

29. The method of claim 28 wherein the notification is via e-mail.

30. The method of claim 28 wherein said another individual is the users manager or supervisor.

31. The method of claim 28 wherein said another individual is responsible for data security.

32. The method of claim 28 wherein said another individual is a computer process.

33. The method of claim 21 wherein said known party is notified of the occurrence of said second condition.

34. The method of claim 33 wherein said notification is via email.

35. The method of claim 21 wherein said knowledge is no longer sensitive because it has been made public or because a predetermined time has passed.

36. The method of claim 21 wherein some other individual, not the known party, is notified of the occurrence of said second condition.

37. The method of claim 36 wherein said notification is via e-mail.

38. The method of claim 21 wherein another individual, not the known party, is notified when the known party attempts to access said specified information in the database more than once.

39. The method of claim 38 wherein the notification is via e-mail.

40. The method of claim 38 wherein said another individual is the users manager or supervisor.

41. The method of claim 38 wherein said another individual is responsible for data security.

42. The method of claim 38 wherein said another individual is a computer process.

43. The method of claim 21 wherein the removed rule is saved in an audit log.

44. The method of claim 21 wherein the rule is not loaded until a specified user logs on to the system.

45. The method of claim 21 wherein the rule is only tested for a specified user.

46. The method of claim 21 wherein said rule is generated upon occurrence of said first specified condition.

* * * * *